E. M. SMITH & J. W. CASSIDY.

J. SCOTT, Assignee, and J. SULLIVAN, Assignee of J. W. CASSIDY, Deceased.

KNITTING MACHINE STOP MECHANISM.

No. 11,366. Reissued Sept. 19, 1893.

Witnesses

C. E. Hunt.

Alfred T. Gage.

Inventors,

Edward M. Smith, surviving inventor.

James W. Cassidy, deceased and John Scott and John Sullivan, assignees by Wm. C. Henderson, Attorney.

UNITED STATES PATENT OFFICE.

EDWARD M. SMITH, OF COHOES, NEW YORK, SURVIVING INVENTOR, AND JOHN SCOTT AND JOHN SULLIVAN, ASSIGNEES; SAID SCOTT ASSIGNEE OF ONE-THIRD, AND SAID SULLIVAN ASSIGNEE OF JAMES W. CASSIDY, DECEASED.

KNITTING-MACHINE STOP MECHANISM.

SPECIFICATION forming part of Reissued Letters Patent No. 11,366, dated September 19, 1893.

Original No. 430,512, dated June 17, 1890. Application for reissue filed November 17, 1892. Serial No. 452,181.

*To all whom it may concern:*

Be it known that EDWARD M. SMITH, a citizen of the United States, residing at Cohoes, in the county of Albany and State of New York, and JAMES W. CASSIDY, late of same place, now deceased, did invent certain new and useful Improvements in Knitting-Machine Stop Mechanism; and said SMITH, as surviving inventor, does hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to knitting machines, more particularly to what is known as a "rib knitting machine," and has for its object to provide means for automatically stopping the machine when a knot or unusual thickness in the thread technically known as a "bunch" forms on the vertical needles. The causes which lead to the formation of this abnormal thickness known as a bunching or knotting of the thread are well known in the art and this loading up of the needles will bring on a "smash up" unless means are employed to prevent it.

To the accomplishment of the foregoing purpose the invention consists in the construction and the combination of parts hereinafter more particularly described and claimed, reference being had to the accompanying drawings, illustrating the application of the invention to a two section rib knitting machine, although it may be applied to other forms, and in which—

Figure 1:
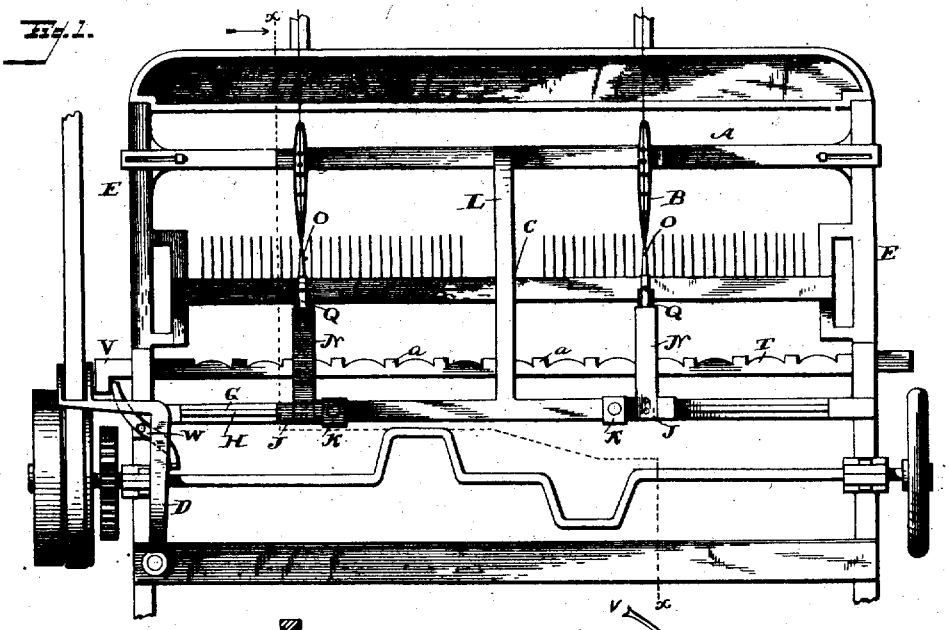
Figure 2:
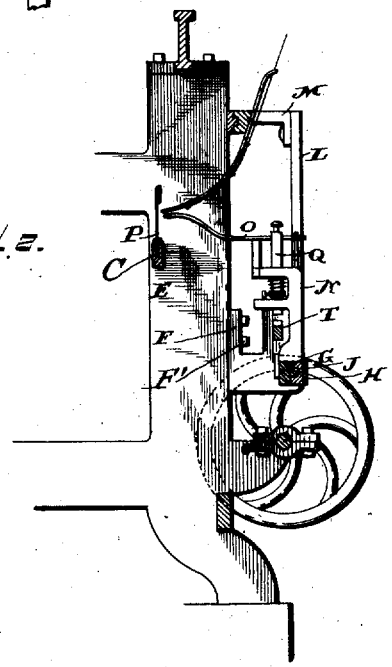
Figure 3:
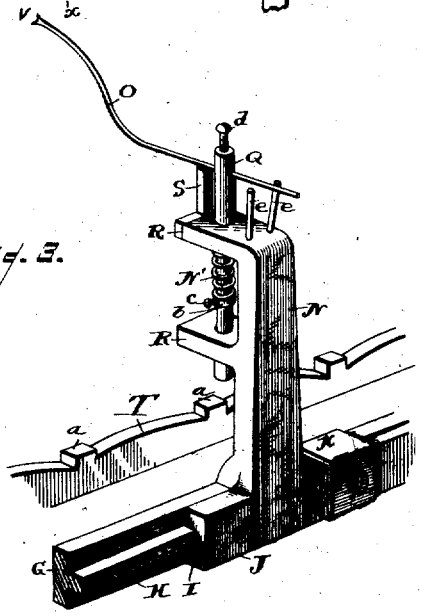

Figure 1 is a perspective of so much of the machine as will illustrate the application of the invention to the machine. Fig. 2 is a vertical transverse section on the line $x$—$x$ of Fig. 1. This is the ordinary, old and well known position of the needles and the thread guides when the horizontal needles are projected to suitable position to receive the thread from the thread guides. Fig. 3 is a detail showing the parts for acting on the belt-shifter.

In the drawings, the letter A designates the thread bar of a rib-knitting machine having the thread guides B, while C designates the needle-bar carrying the upright needles P, and D is the belt-shifter, usually operated by hand to shift the belt to throw the machine into and out of action, as may be desired.

The parts so far described in construction, operation, and purposes effected are the same as in machines well known to the trade, and therefore will not be more enlarged upon, as the same is unnecessary to an understanding of the present invention.

To the upright end portions E of the machine below the needle bar are secured brackets F, which support a transverse bar G, having preferably a bead or tongue H extending lengthwise thereof, and which enters a groove I in a bar J, adapted to be reciprocated longitudinally of the bar G, and which is held to the bar by suitable means, say by clasps K. This bar J is reciprocated from the reciprocating thread bar A, by connecting it thereto by means of a rod L, which at its upper end may be connected to an arm M on the thread bar, so that its upper end may stand out in the vertical plane of its lower end.

The reciprocating bar J is provided with a series of upright standards or supports N, preferably with one for each thread guide, and designed to support fingers O adjacent to the thread guides or carriers, with their forward ends near enough to the needles P in the reciprocation of the fingers and thread carriers for the thread not to interfere with the free passage of the fingers back and forth unless there be a knot or abnormal thickness in the thread formed on the needle in which event the bunch or knot and the end of the finger will come in contact with each other and the knot or bunch press the finger to one side to release a detent or locking pin, which, when released, will set in motion a shifting bar to operate a belt shifter to throw the machine out of operation and thus prevent injury and afford an opportunity to remove the knot or abnormal thickness. The preferred manner of setting the fingers is to pass them through or otherwise attach them to the detents or locking pins Q, which pass loosely through one or more lateral arms R, extending from the supports N, and to provide a bridge or rest S on the upper arm R, on which the wire will rest when in its normal position, and from which it will be dislodged when moved by the knot or bunch in the thread. When in its normal position, the fingers will hold up the detent or locking pin, so that the reciprocating bar carrying it will be free to move back and forth with the movement of the thread-bar; but when moved from its rest the pin or detent will drop and engage a projection on the shifting bar T, so as to lock the two bars together and cause them to move in unison far enough for the shifting bar to act on the belt shipper to throw off the belt and stop the machine. This shifting bar slides in ways or slots made in the brackets F, and, except when moved by engagement of the locking pin therewith, remains stationary. It is formed with a series of projections *a*, and preferably by serrating its upper edge, and preferably so as to make the projections of the convex and angular shapes illustrated. The detent or pin may be dropped wholly by gravity; but it is preferred to quicken its dropping by positive means which may be by a coiled spring N′, encircling the pin with one end connected to it, say by bearing against the collar *b*, held thereto by a set screw *c* by which the tension of the spring can be regulated, and the other end bearing against a suitable bearing, say against one of the arms R.

The finger O may be pressed through a hole in the pin Q and held therein at any desired adjustment by a set screw *d*, and pins or stops *e* will limit the lateral movement of the fingers. It is preferred to form the end of the finger O with a notch or fork *r*, through which the thread will pass, and any enlargement in the thread striking the finger or wall of the fork will move the finger and operate it, as hereinbefore described.

The end of the shifting bar T next to the power belt and its pulley is provided with a down hanging arm V, which when moved in one direction—say to the right of the machine—will strike a pivoted arm or lever W, preferably of the form shown, and turn the same so as to throw its other end against the belt shipper D and move the same so as to throw off the belt. On the other hand if the shifting bar be moved to the left its down hanging arm will strike the fork of the belt shipper and move the same so as to throw off the belt. The invention is not limited to the particular devices shown for actuating the belt shipper.

It will be seen from the foregoing that in whichever direction the fingers be traveling when the locking pin is dropped the shifting bar will be moved to throw off the belt and stop the machine.

There is shown and described what is considered to be the best construction and arrangement of parts, but by doing so it is not wished to be understood as restricting the invention to such details.

In the drawings the finger O is shown in Fig. 2 closer to the thread guide and farther from the needles than it will be in actual practice, as is obvious to those skilled in the art, but by applying the brackets F properly by means of the bolts F′, and then adjusting the finger, as will occur to the mechanic, the finger will be brought to its proper position in relation to the vertical and horizontal needles and the thread guides, which may vary according to existing conditions.

It will be observed that the support to which the finger O is attached is sustained as by the guide bar G independently of the thread-carrying bar. This relieves the finger from the vibration or jarring of the parts from which motion is transmitted to the finger through the rod L, which jarring would be transmitted to the finger if it were not so independently supported and this is an important feature of the invention. The guide bar G, along which the finger slides, also serves to impart rigidity and firmness to the finger in its reciprocation and to prevent the same from vibrating to and from the needles by jarring of the machine or parts thereof, of which there is more or less in the working of the machine, and which if permitted to act on the finger, would at times throw the ends of the finger so close to the needles or threads as to cause contact between the finger and said needles or threads when not intended, which would lead to the deflecting or derangement of the finger and the stopping of the machine when it should not be stopped. The value of using a guide bar to prevent the vibration of the finger will therefore be appreciated. It will be observed also that this guide G is not the bar on which the thread carrying bar reciprocates but is a separate guide used for steadying the finger.

Having described the invention and set forth its merits, what is claimed is—

1. In a knitting machine, the combination with the needles and thread carrying bar, of a reciprocating bar connected with the thread carrying bar to move therewith, fingers carried adjacent to the thread guides by said reciprocating bar and having their ends in such proximity to the needles as to be deranged by a knot or abnormal thickness, as a "bunch," in the thread fed from the thread guides, and means set in motion by derangement of said fingers and actuating the belt shipper to throw off the belt and stop the machine, substantially as and for the purposes set forth.

2. In a knitting machine, the combination with the needles and thread carrying bar, of a reciprocating bar connected with the thread carrying bar to move therewith, uprights or supports carried by said reciprocating bar, a detent or locking pin carried by each support, a finger supported from each support adjacent to the thread guide and having a connection with said detent or locking pin to act thereon, with a part of the finger in such proximity to the needles as to be deranged by a knot or abnormal thickness, as a "bunch,"

in the thread fed from the thread guides to release said detent or locking pin, a shifting bar normally at rest and connected to the reciprocating bar to move therewith by said locking pin when the same is released by derangement of said finger, and a belt-shipper actuated from said shifting bar to stop the machine when said finger is deranged as specified, substantially as and for the purposes set forth.

3. In a knitting machine, the combination with the needles and thread carrying bar, of a reciprocating bar connected with the thread carrying bar to move therewith, uprights or supports carried by said reciprocating bar and each having thereon a bridge or rest, detents or locking pins carried by said supports, fingers adjacent to the thread guides and connected with said detents and resting on said bridges and having a portion thereof in such proximity to the needles as to be deranged by a knot or abnormal thickness, as a "bunch," in the thread to release the detents or locking pins, a shifting bar having projections thereon and standing at rest, except when locked to the reciprocating bar by said detent or locking pin, and a lever acted on by said shifting bar to actuate a belt shipper to stop the machine when said finger is deranged as specified, substantially as and for the purposes set forth.

4. In a knitting machine the combination with the needles and thread carrying bar, of a finger adjacent to the thread guide and standing in such proximity to the needles as to be deranged by a knot or abnormal thickness, as a "bunch," in the thread, a reciprocating bar below the needles and carrying said finger, and means intermediate of said finger and the belt shipper and actuated by the derangement of said finger to transmit motion to the belt shipper to stop the machine when said finger is deranged as specified, substantially as and for the purposes set forth.

5. In a knitting machine, the combination with the needles and thread carrying bar, of a belt shipper, a finger reciprocating in front of the needles and adapted to be deranged by a "bunch" in the thread to set the belt shipper in operation to stop the machine, means intermediate of the finger and shipper to cause the shipper to act on the derangement of the finger, and a support for said finger sustained independently of said thread carrying bar, substantially as and for the purposes set forth.

6. In a knitting machine, the combination with the needles and thread carrying bar, of a belt shipper, a finger reciprocating in front of the needles and adapted to be deranged by a "bunch" in the thread to set the belt shipper in operation to stop the machine, means intermediate of the finger and shipper to cause the shipper to act on the derangement of the finger, a support for the finger, and a stationary guide adapted to steady the finger and hold it against lateral vibration to and from the needles, substantially as and for the purposes set forth.

In testimony whereof we affix our signatures in presence of two witnesses.

EDWARD M. SMITH,
*Surviving inventor.*
JOHN SCOTT,
JOHN SULLIVAN,
*Assignees.*

Witnesses as to Smith and Scott:
JOHN J. SCOTT, Jr.,
T. F. MCDERRATT.
Witnesses as to Sullivan:
HIRAM A. COOL,
KENT W. FORD.